2 Sheets, Sheet 2.
Cooke & Stansfield,
Machine Gearing.
N° 70,416. Patented Nov. 5, 1867.
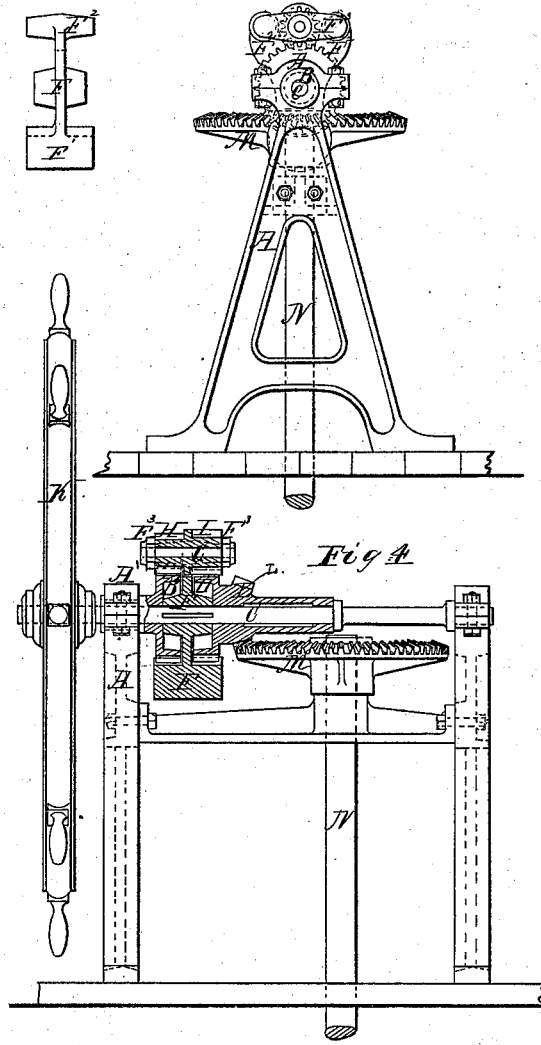
Witnesses,
Wm Robt Lake
L. R. Brodnux
Inventor:
Charles Frederick Cooke
John Stansfield

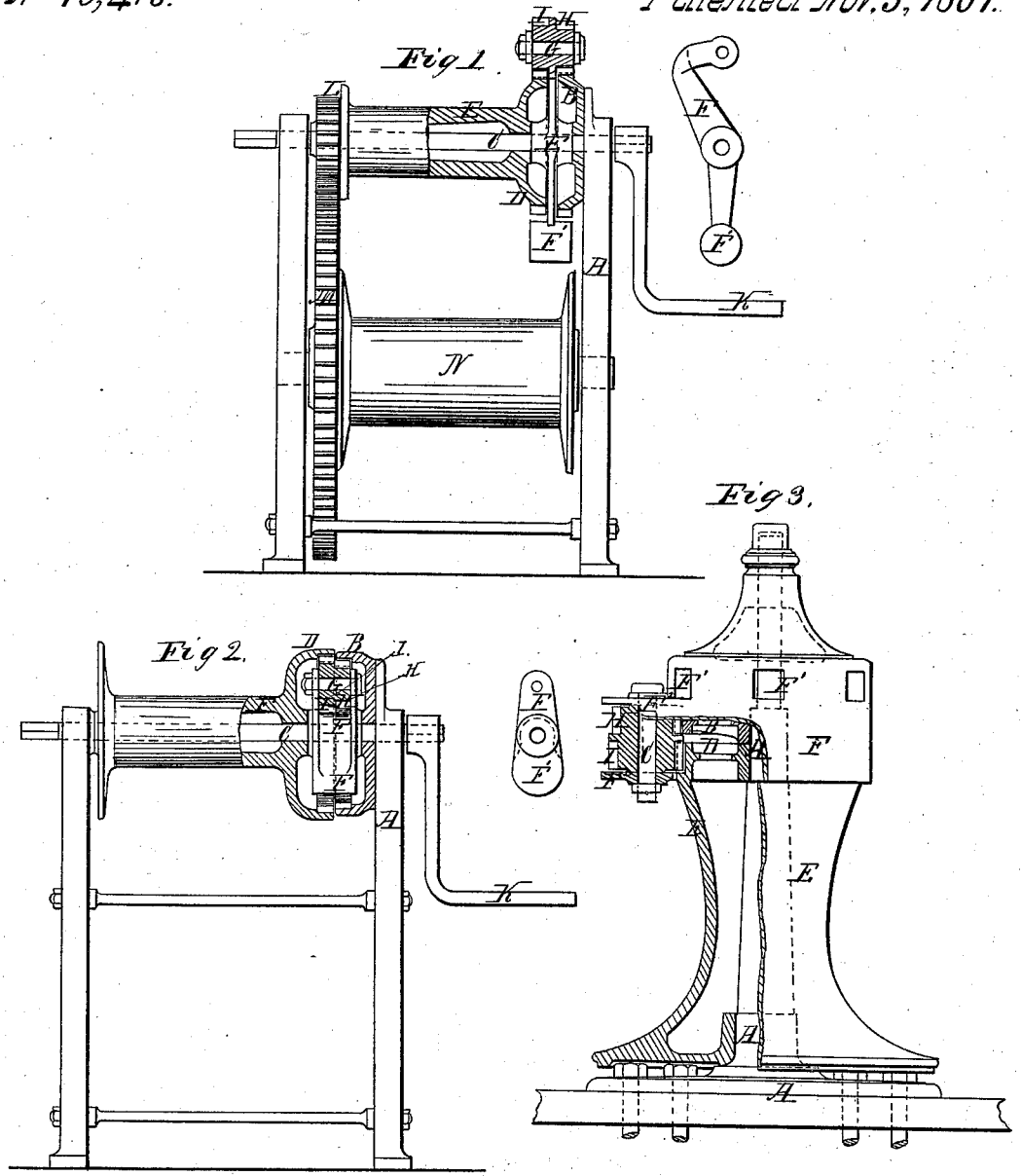

United States Patent Office.

CHARLES FREDERICK COOKE, OF YORK, AND JOHN STANDFIELD, OF LAMBETH, GREAT BRITAIN.

*Letters Patent No. 70,416, dated November 5, 1867.*

IMPROVEMENT IN DIFFERENTIAL WHEEL-GEARING.

The Schedule referred to in these Letters Patent and making part of the same.

TO ALL WHOM IT MAY CONCERN:

Be it known that we, CHARLES FREDERICK COOKE, of the Buckingham Works, in the city of York, engineer, and JOHN STANDFIELD, of Upper Stamford street, Lambeth, in the county of Surrey, engineer, both in the Kingdom of Great Britain, have invented certain new and useful, "Improvements in Differential Wheel-Gearing, and its application to various purposes;" and we do hereby declare that the following is a full and exact description thereof, reference being had to the accompanying drawings, and to the letters of reference marked thereon.

Our invention consists in certain novel arrangements and combination of wheels, and of parts connected therewith, forming a differential safety-gear apparatus.

This gear is applicable generally for transmitting motion and increasing or diminishing the speed of certain parts of machines, such as tools for turning, screw-cutting, boring, wheel-cutting, and others; but we more particularly intend to apply it to crabs, hoists, and cranes, to capstans and windlasses, and to steering apparatus for ships, traction engines, and the like purposes, in all of which its peculiarity as safety or lock-gear is of the greatest importance.

Applied to crabs the gear consists, in its most simple form, of four spur-wheels, which may be disposed as follows: The first wheel of, say forty-one teeth, is placed loose on or concentric with the main arbor or barrel-shaft, and is fixed to the frame, and not revolving. The second wheel of, say, forty-two teeth, fixed to the chain-barrel, is placed loose on the main arbor. A disk-wheel or arm, which we call the carrier, keyed to the main arbor between the first and second wheel, carries, on a second arbor, the third and fourth or carrier-wheels, which are either cast in one piece or keyed to the arbor, the third wheel of, say, fifteen teeth, gearing into the first wheel of forty-one teeth, and the fourth wheel of, say, fourteen teeth, gearing into the second wheel of forty-two teeth. When the main arbor is turned round by means of the handle the carrier will cause the third wheel to roll round the first wheel, and the fourth wheel, being in one piece with the third wheel, will roll round the second wheel, and at the same time move it four teeth forward for each revolution of the main arbor. Owing to the peculiar arrangement described the barrel can only be turned through the carrier, and on the handle being released the barrel will remain stationary, although the load be suspended from the barrel, the load or pull on the barrel giving the third and fourth wheels a tendency to revolve in a direction contrary to that in which they have to revolve for lowering the load. The gear is therefore a safety-gear, and the ratchet-wheel and pawls necessary in ordinary crabs and other machines can be dispensed with. Instead of having the first wheel secured to the frame, and not revolving, it may be connected with and held by a friction-band or other brake for the purpose of permitting of the more rapid lowering of a load or of the empty chain.

One part of our invention consists in forming crabs and other hoisting apparatus, constructed with our gear, into weighing apparatus for ascertaining and indicating the weight of the load suspended from the barrel. To effect this the first wheel, instead of being immovably fixed to the frame, is allowed to turn to a certain extent on the main arbor, its motion being limited by a graduated lever or steelyard attached to it, which is furnished with a sliding weight; or instead of the steelyard a combination of levers, such as is usual in connection with ordinary weighing apparatus, may be employed. In raising a load its weight can by this means be at once ascertained, which will save the extra labor of separate weighing.

For some purposes, again, the first wheel, instead of being fixed, may have motion communicated to it from some independent source; but in all cases, whether ordinary spur-wheels, internal wheels, or bevel-wheels be used, our differential gear is composed of four wheels, the first being either fixed or limited in its revolving motion, according to the object in view, the second wheel being on the same axis as the first, and the third and fourth wheels made of or formed into one piece, and carried by a carrier round the axis of the first and second wheels, into which they respectively gear.

We will now proceed to describe the mode in which our improved gear may be applied to various purposes, reference being had to the annexed sheet of drawings, and to the letters and figures marked thereon.

Figure 1 is a front elevation, partly in section, of a crab, to which our differential gear is applied.

A is the frame, to which the first or fixed wheel B of forty-two teeth is attached, concentric with the arbor C. The second wheel D of forty-one teeth, cast in one piece with the barrel E, turns loose on the arbor C. F is the carrier-arm, shown detached in side elevation, keyed to arbor C, the forked end of which carries the second arbor, on which the third and fourth or carrier-wheels H of fourteen teeth, and I of fifteen teeth, which are cast in one piece, revolve.

By turning the arbor C with carrier F round one revolution by means of the handle K the wheel H will, in rolling round wheel B, make three revolutions, and the wheel I being in one piece with H will likewise make three revolutions, and consequently the wheel D, with barrel E attached, will be turned round to the extent of four teeth. On the handle being released, the barrel E with load suspended will remain stationary, for the reasons already explained.

The gear B D H I, with barrel E, forms a single-purchase crab, which, through the addition of pinion L, fixed to barrel E, and wheel M and barrel E is formed into a compound crab for heavier loads. The weight F′ is for the purpose of counterbalancing the wheels H and I and forked carrier ends.

Figure 2 represents one modification of crab, with internal wheels, the carrier F being again represented detached in side elevation, the letters of reference used denoting corresponding parts to those in fig. 1.

The use of internal gear for crabs has the advantage of giving increased power, and at the same time securing the attendants from contact with the wheels, which are boxed in. The gear may be applied to crabs and other hoisting apparatus in a variety of ways, and instead of the carrier being as described, it may, when the carrier-wheels are of larger diameter, gearing into internal wheels, be in the form of an eccentric, upon which the carrier-wheels revolve; or, again, the carrier may be a crank on a separate arbor, the carrier-wheels revolving on the crank-pin.

Figure 3 represents one mode in which our gear may be applied to a ship's capstan.

A is the standard or pillar, supported to be bolted to the deck planks. At the upper part of A is keyed the fixed wheel B, whilst the second wheel D is again cast in one piece with the barrel or drum E of the capstan. The cap F, formed with the usual spar-sockets F¹, acts at the same time as carrier, and supports in the box F², which is cast in one piece with it, the second arbor G, with the carrier-wheels H and I. Supposing the number of teeth in the four wheels B D H I to be forty-two, forty-one, fourteen, and fifteen teeth respectively, the capstan-barrel E will be turned by four teeth of the wheel D, or rather less than one-tenth of a revolution for every revolution of the cap F. The capstan is worked, like the ordinary capstans, by means of spars inserted into the sockets F¹, and the hold on the spars may be released at any time. The capstan-barrel with weight suspended from it always remains in its position without the necessity of a ratchet-wheel and pawls, as in ordinary capstans, and with perfect safety to the hands employed in working it. In order to reduce the strain upon the teeth of the four wheels B D H I, the cap F may be made with a second box, F², arbor G, and wheels H I.

Figure 4 represents a side elevation, partly in section, of a steering apparatus for vessels, to which our differential safety-gear is applied; and Figure 5 is an end elevation of the same, the hand-wheel being removed.

A is the frame. The fixed wheel B is secured by the pedestal-cap A′, and is prevented from turning round by means of a key in the usual manner. The shaft C, which carries the hand-wheel K, has its bearing at one end in the fixed wheel B. The second wheel D is cast in one piece with the bevel-pinion L, which latter gears into the bevel-wheel M keyed to the upper end of the rudder-post N. The carrier-wheels H I revolve on the second arbor G, which is held at both ends by the plates F³, which are screwed to and connect the fork ends F² of carrier F, which is keyed to shaft C. F¹ acts as counterweight to the wheels H I, fork ends F², and plates F³.

This steering apparatus is by the application of our gear again made into a safety apparatus. The hold upon the hand-wheel K may be released at any time, and whatever the position of the rudder it will remain the same until changed through the hand-wheel.

What we claim, and desire to secure by Letters Patent, is—

1. The novel combination and arrangement of differential wheel-gearing, and its application to various purposes, in the manner substantially as described; and 2. The combination of our said differential wheel-gear with parts for the purpose of forming crabs and other hoisting apparatus into self-acting weighing machines, in the manner substantially as described.

CHARLES FREDERICK COOKE,
JOHN STANDFIELD.

Witnesses:
WM. ROBT. LAKE,
L. R. RODMER.